UNITED STATES PATENT OFFICE.

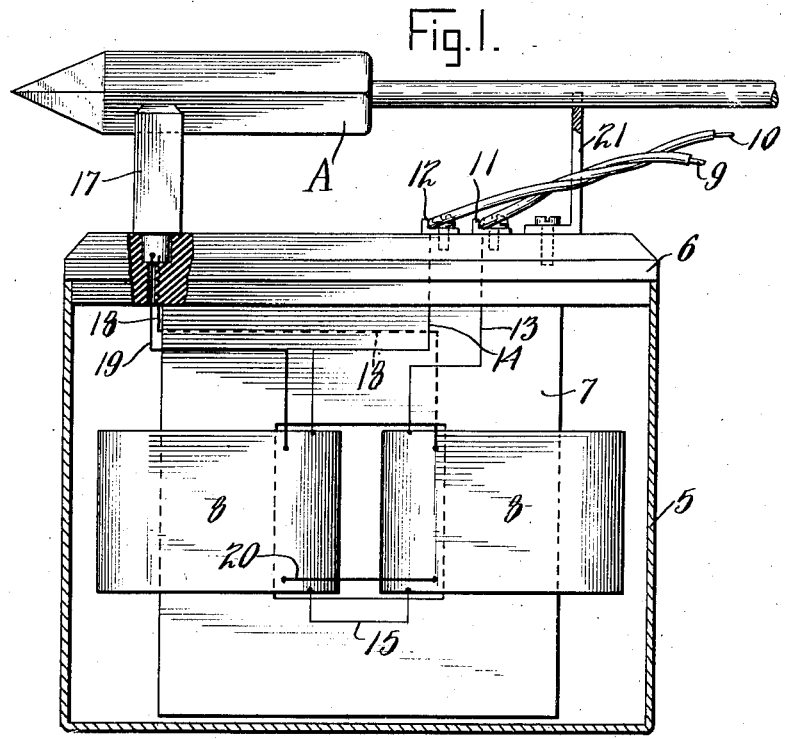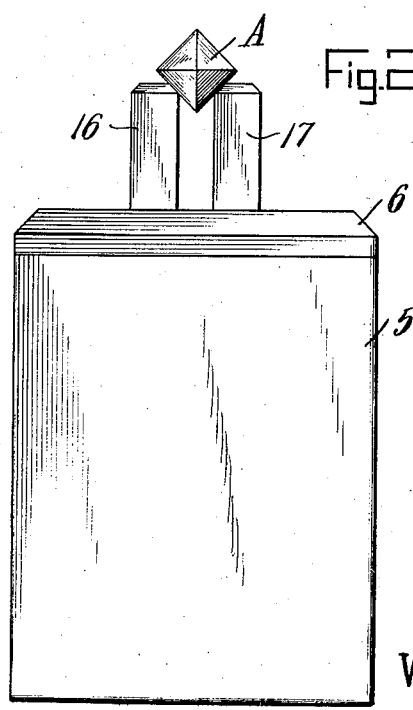

WILLIAM A. LANAHAN, OF MEMPHIS, TENNESSEE.

ELECTRIC HEATER FOR SOLDERING-IRONS.

1,330,712. Specification of Letters Patent. Patented Feb. 10, 1920.

Application filed March 31, 1919. Serial No. 286,320.

*To all whom it may concern:*

Be it known that I, WILLIAM A. LANAHAN, a citizen of the United States, residing at Memphis, in the county of Shelby and State of Tennessee, have invented certain new and useful Improvements in Electric Heaters for Soldering-Irons, of which the following is a specification.

My said invention relates to electric heaters and more particularly to a means for heating soldering irons for welding wires or brazing together small articles, and has for its object to provide a device in which various sizes of soldering irons may be conveniently heated without adjustment. Another object is to construct a device of a form which can be conveniently carried about from place to place. With these and other objects in view, the invention consists of a combination and arrangement of parts clearly described in the specification and particularly pointed out in the appended claims.

Referring to the accompanying drawings which are made a part hereof and on which similar reference characters designate similar parts, Figure 1 is an elevation of the device with the casing shown in section and more clearly illustrating the inner structure thereof, and Fig. 2, an end elevation of the device, to clearly illustrate the contact members.

In the drawings the numeral 5 designates the casing, closed at the top by means of an insulating cover 6. Secured to the cover 6 and located within the casing 5 is a transformer comprising a suitable core 7 upon which are mounted the customary coils 8. Leading-in wires 9 and 10 are connected respectively to binding posts 11 and 12 mounted upon the upper surface of the cover 6, which posts are connected to the primary coils of the transformer by means of wires 13 and 14. The two primary coils are connected in series by means of a bridge wire 15, thereby completing the primary circuit. Suitably mounted upon the upper surface of the cover 6 and insulated from each other by means of the cover is a pair of contact members 16 and 17 beveled at their upper ends to prevent the chipping thereof.

Leading from the lower ends of these contact members are wires 18 and 19, each of which is connected to one side of the secondary coils of the transformer. The said secondary coils are bridged together by means of the wire 20, thereby completing the circuit with the exception of the gap between the contact members 16 and 17. As a means of holding a soldering iron A in the proper position I have provided a rest 21 which is secured upon the upper surface of the insulated cover 6 at the opposite end thereof at which the posts 16 and 17 are located.

It will readily be understood that with the current passing through the wires 9 and 10 and through the primary coil, a flow of electrical energy will be created in the secondary coils of a high enough amperage to sufficiently heat any metallic object such, for instance, as the soldering copper A, when the members 16 and 17 are short circuited by means of said soldering iron.

It is also to be understood that the transformer is not of any particular design or manufacture, but any suitable transformer designed to operate on a standard alternating current and with the secondary coils wound to produce between 6 and 12 volts at a high amperage will be sufficient.

Having thus fully described my said invention, what I claim as new and desire to secure by Letters Patent, is:

1. The combination with a portable case of a transformer within the case, leading-in wires connected with the primary winding of the transformer, a plurality of implement supports upon the case, one of which comprises spaced and insulated terminals, and a circuit including the secondary winding of the transformer and the terminals adapted to be closed by supporting an implement between and upon said terminals.

2. An implement heating device comprising an implement support, spaced and insulated terminals spaced from and alined with the support and constituting a second support, and an electric-supply circuit including said terminals adapted to be closed by an instrument laid upon the supports.

3. An implement heating device embodying a transformer comprising a wound core, leading-in wires connected with the winding, secondary circuit wires tapped off from the winding, and spaced insulated terminals for the secondary circuit wires positioned to close the circuit by the interposition of the implement to be heated between the terminals.

In witness whereof I have hereunto set my hand and seal at Memphis, Tennessee, this 25th day of March, A. D. nineteen hundred and nineteen.

WM. A. LANAHAN. [L. S.]

Witnesses:
H. H. BARKER,
C. C. CLINE.